(12) United States Patent
Bedford et al.

(10) Patent No.: US 7,516,805 B2
(45) Date of Patent: Apr. 14, 2009

(54) EQUALIZER BAR MOUNTING ARRANGEMENT

(75) Inventors: Billy R. Bedford, Peoria, IL (US); Frederick R. Brotherson, Morton, IL (US); Mark J. Roeder, Saint Martin d'Uriage (FR)

(73) Assignee: Caterpillar Inc., Peoria, IL (US)

( * ) Notice: Subject to any disclaimer, the term of this patent is extended or adjusted under 35 U.S.C. 154(b) by 338 days.

(21) Appl. No.: 11/312,079

(22) Filed: Dec. 20, 2005

(65) Prior Publication Data

US 2007/0151775 A1    Jul. 5, 2007

(51) Int. Cl.
   *B62D 55/08*    (2006.01)
(52) U.S. Cl. .................. 180/9.5; 180/9.46; 180/9.52; 180/9.54; 180/9.62; 403/150; 403/152; 403/157
(58) Field of Classification Search .............. 180/9.5, 180/9.46, 9.52, 9.54, 9.62; 403/150, 152, 403/157
   See application file for complete search history.

(56) References Cited

U.S. PATENT DOCUMENTS

| | | | | |
|---|---|---|---|---|
| 3,759,541 A | * | 9/1973 | Peterson | .............. 280/124.111 |
| 4,018,295 A | * | 4/1977 | Hasselbacher | ............... 180/9.5 |
| 4,324,303 A | | 4/1982 | Balzer | |
| 4,364,443 A | * | 12/1982 | Sato et al. | ..................... 180/9.5 |
| 4,385,673 A | * | 5/1983 | Olt, Jr. | ......................... 180/9.5 |
| 4,483,406 A | | 11/1984 | Smith | |
| 4,690,231 A | | 9/1987 | Riml | |
| 4,838,373 A | * | 6/1989 | Price et al. | .................. 180/9.46 |
| 5,951,192 A | * | 9/1999 | Collins | ......................... 403/150 |
| 6,298,933 B1 | | 10/2001 | Simmons | |
| 6,378,635 B1 | | 4/2002 | Yoshida et al. | |
| 6,823,953 B2 | * | 11/2004 | Castrignano | ............... 180/9.46 |
| 6,880,901 B2 | * | 4/2005 | Tamaru | ....................... 305/109 |
| 2006/0131083 A1 | * | 6/2006 | Matthys et al. | ............... 180/9.5 |

\* cited by examiner

*Primary Examiner*—Paul N Dickson
*Assistant Examiner*—Marlon A Arce

(57) ABSTRACT

An equalizer bar for a tracked vehicle is connected to the track roller frames via an arrangement comprising a pin which is swivel ably mounted to the equalizer bar and held rigidly by the track roller frame. The pin is positively held by the track roller frame, for example by channels in which the pin sits such that the side load is at least partially absorbed by the channel walls rather than the fasteners. The fasteners are located such that they experience minimal side load and aid a positive location of the pin in the channels.

18 Claims, 4 Drawing Sheets

EQUALIZER BAR MOUNTING ARRANGEMENT

TECHNICAL FIELD

The disclosure generally relates to an arrangement for connecting two frames of a work machine and in particular, but not exclusively, to an arrangement for connecting a track roller frame to an equalizer bar of a track-type work machine.

BACKGROUND

Track type work machines commonly use an equalizer bar between both the left and right hand tracks to allow a degree of flexibility in movement of the tracks relative to the main frame. The equalizer bar is pivot ably mounted to the main frame at a center line of both the main frame and the equalizer bar, whilst the two ends of the equalizer bar are connected with the left hand and right hand side track roller frames respectively. The connection between the equalizer bar and the track roller frame must allow a degree of movement between the equalizer bar and the track roller frame whilst being able to sustain severe loading. U.S. Pat. Nos. 4,324,303 and 4,018,295 describe solutions wherein an equalizer bar is mounted to a track roller frame bearing by a split cap arrangement.

Disadvantages of such constructions may be that the joint is complex or not sufficiently durable, the pin is prone to seizure due to rust or deformation and assembly and disassembly may be relatively difficult.

This disclosure is directed at overcoming one or more of the aforementioned disadvantages.

SUMMARY OF THE INVENTION

The present disclosure reveals an embodiment of an arrangement for connecting a track roller frame to an equalizer bar of a work machine wherein the arrangement includes a pin connected with the equalizer bar and projecting therefrom. The pin has a surface portion with a passage therethrough and the track roller frame has a surface portion corresponding to the surface portion of the pin. The surface portion of the track roller frame has a passage extending therethrough, and a fastener extends through both the passages in the surface portions of the pin and the track roller frame.

Another embodiment discloses a method of connecting a track roller frame to an equalizer bar of a work machine. The method includes the steps of providing the equalizer bar with a projecting pin having a longitudinal axis such that the longitudinal axis has three rotational degrees of freedom relative to the equalizer bar, positioning at least a portion of the pin in a recess located on the track roller frame, fastening the pin to the track roller frame by extending a fastener through the pin into a portion of the track roller frame.

Other features and aspects of this disclosure will be apparent from the following description and the accompanying drawings.

DETAILED DESCRIPTION

Figure 1:
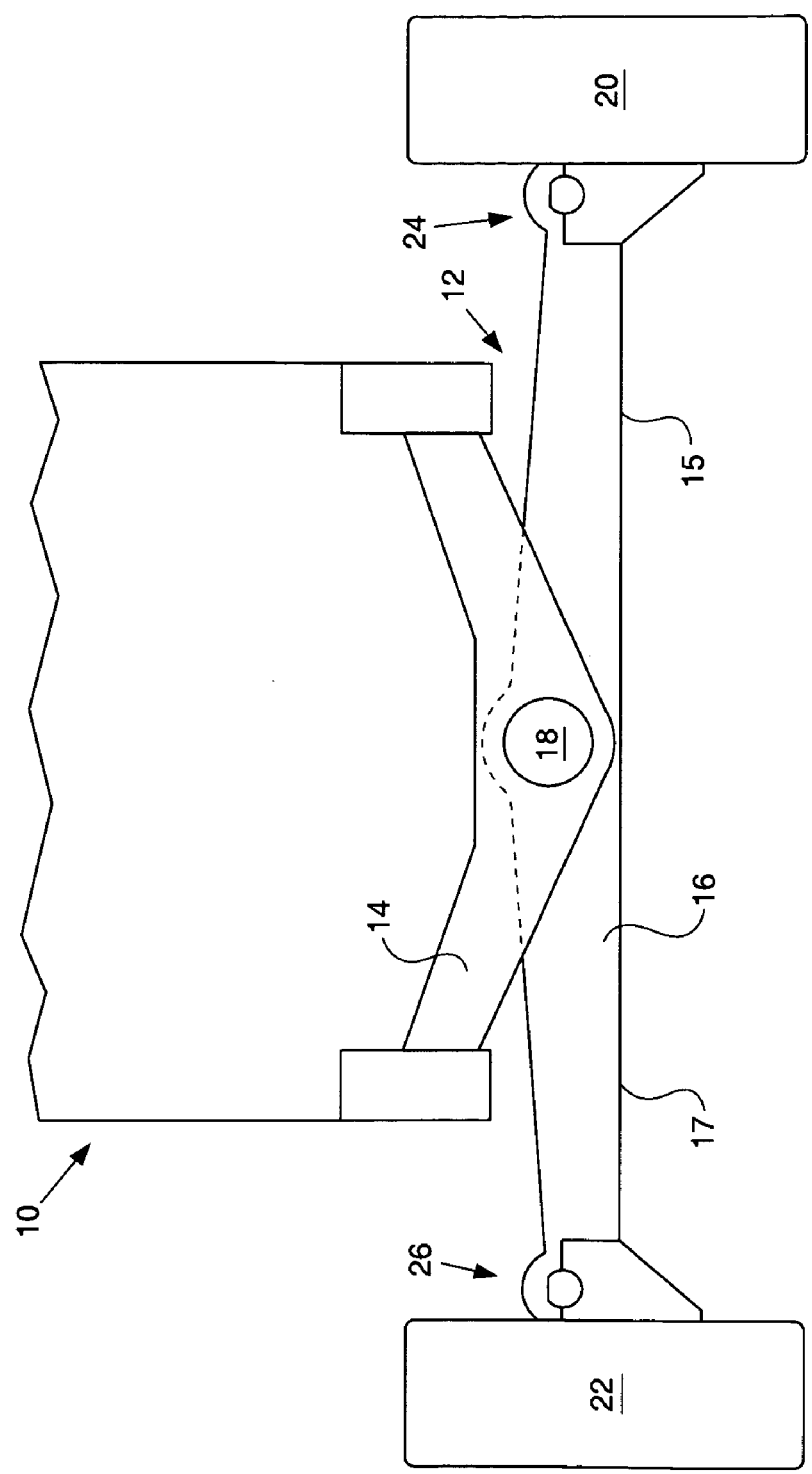
FIG. 1 is a diagrammatic representation of an undercarriage arrangement for a work machine in accordance with an embodiment of the current disclosure.

FIG. 1 shows an embodiment of an undercarriage 12 for a tracked work machine 10. The tracked work machine 10 may be propelled forward by any drive arrangement (not shown), which typically may be a pair of opposing drive shafts connected to the tracks adjacent to the rear end of the tracks (not shown). The undercarriage 12 may include a main frame 14, which is connected to an equalizer bar 16 via a pivot arrangement 18. The opposing first end 15 and second end 17 of the equalizer bar 16 are connected to a first track roller frame 20 and a second track roller frame 22 via connection arrangements 24 and 26 respectively. The pivot 18 enables the equalizer bar 16 to swivel relative to the main frame 14 to accommodate movement of the first and second track roller frames 20 and 22, which may for example occur when the work machine 10 travels over uneven terrain. Both the first and second track roller frames 20 and 22 may be connected with the equalizer bar 16 in the same manner therefore only the connection between the equalizer bar and the first track roller frame 20 will be discussed in further detail, but it is to be understood that the same principle applies to the connection between the equalizer bar 16 and the second track roller frame 22.

Figure 2:
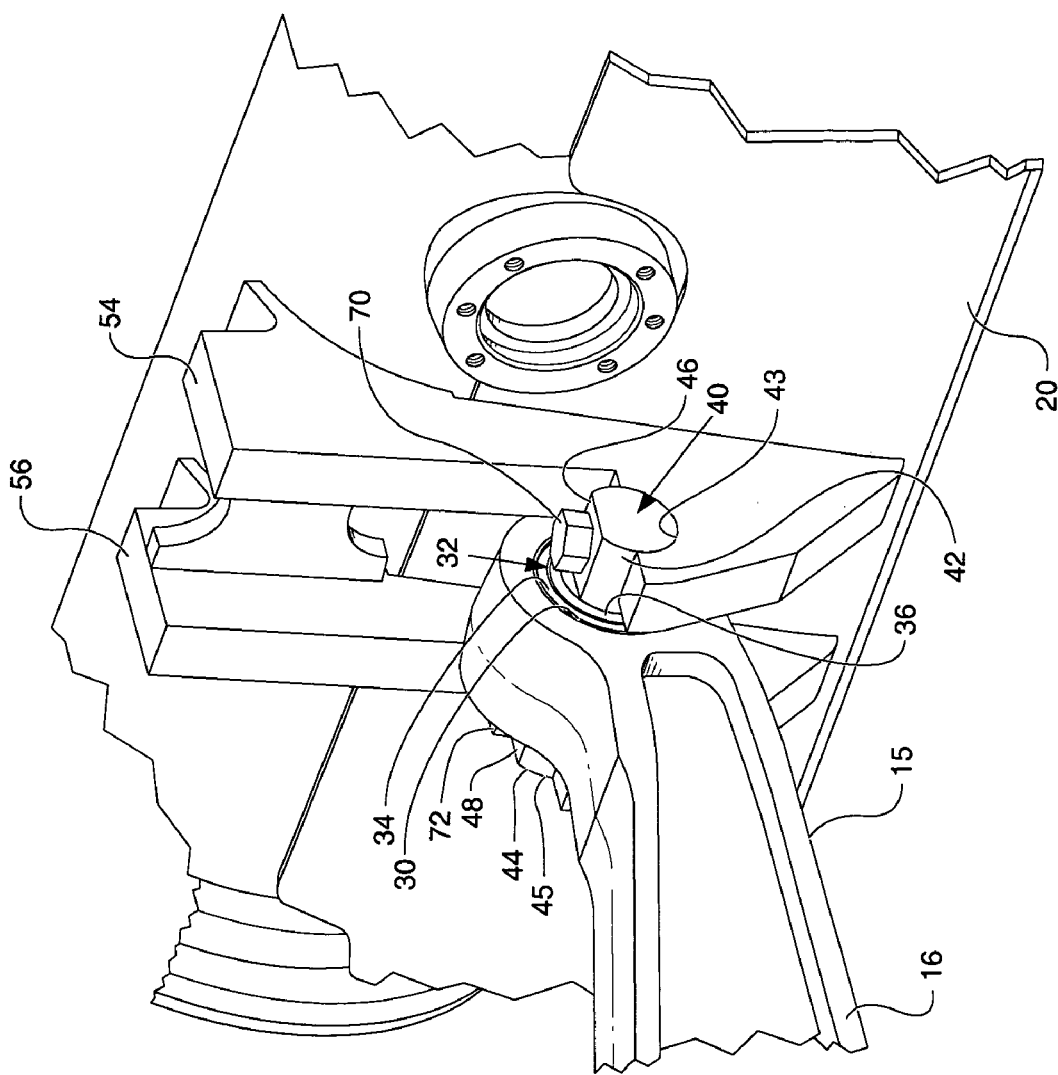
FIG. 2 is a drawing showing a more detailed view of a portion of the arrangement of FIG. 1
Figure 3:
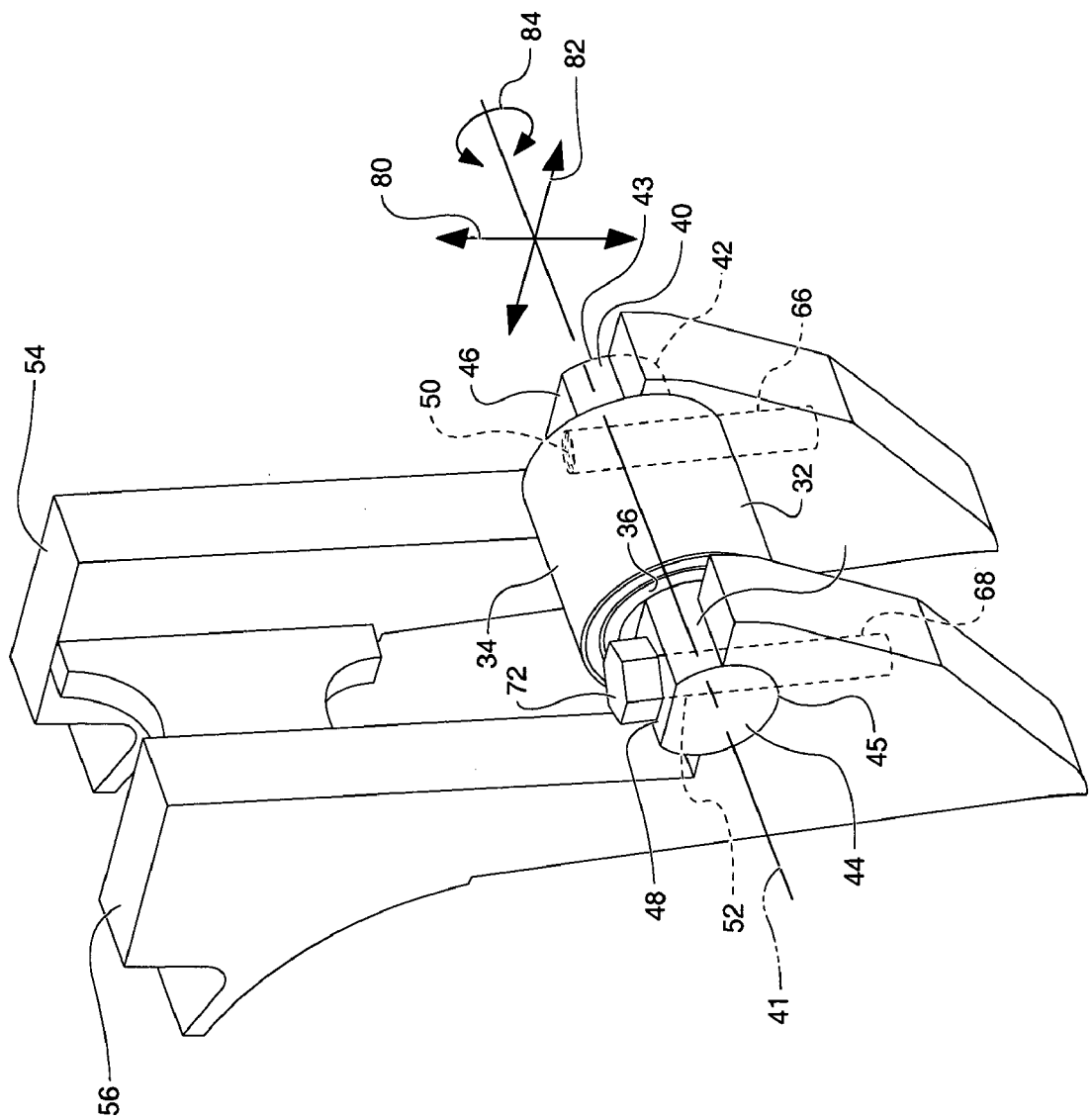
FIG. 3 is a more diagrammatic representation of a portion similar to that shown in FIG. 2 but from a different perspective.
Figure 4:
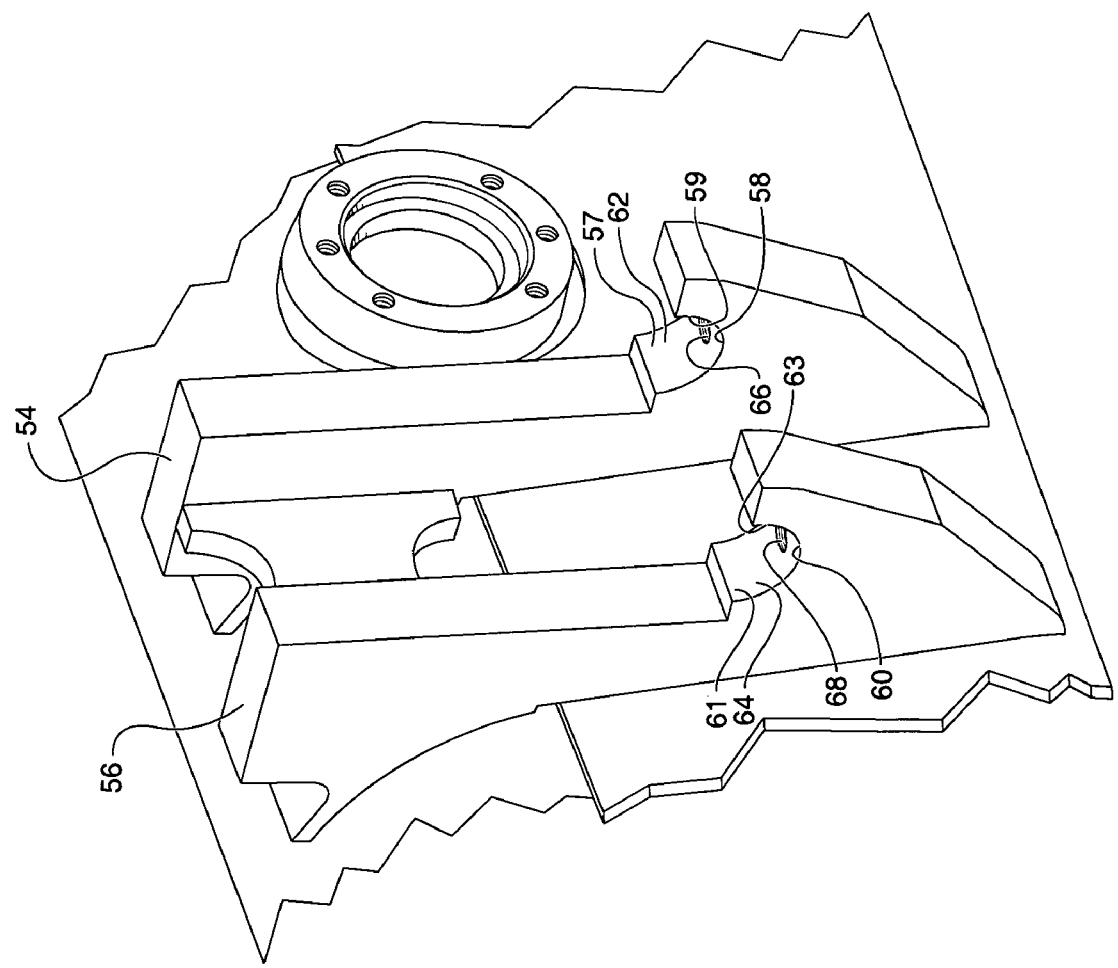
FIG. 4 shows a representation of a portion of a track roller frame suitable for the arrangement of FIG. 1.

Further referring to FIGS. 2, 3 and 4, the first end 15 has a passage 30, which is machined to receive a bearing 32. The bearing 32 is preferably a bearing that can accommodate a certain degree of misalignment or has self-aligning properties such as for example a spherical bearing or an elastomeric bearing, but any suitable bearing arrangement may be used. The bearing may be held in place in the passage 30 via any suitable means, e.g. press fitting or a circular spring and groove arrangement. The bearing 32 in this embodiment has an outer race 34 and an inner race 36 which are arranged such that the inner race 36 can rotate and swivel within the confines of the outer race 34 without being able to leave the confines of the outer race 34 during normal operation. The inner race 36 is in contact with a pin 40, which extends through the bearing 32 so that its longitudinal axis 41 projects from at least one but preferably two sides of the equalizer bar. The first portion 42 and the second portion 44 are the portions of the pin 40 that project from the equalizer bar 16. It follows that the pin 40 may rotate and swivel relative to the equalizer bar 16 such that the longitudinal axis 41 has the three rotational degrees of freedom relative to the equalizer bar 16. The three rotational degrees of freedom are commonly known as pitch, yaw and roll. Pitch in this context may be described as the first and second portions 42 and 44 both moving in a generally vertical plane but in opposing directions as represented by the double arrow headed line 80. Yaw is similar to pitch but takes place in generally horizontal directions as represented the double headed arrow line 82 and roll is where the pin 40 may roll around its longitudinal axis 41 as represented by line 84. Of course the three rotational degrees of freedom may be combined or limited in any suitable manner if preferred.

The pin 40 may be engaged with the inner race 36 in any suitable manner such as, for example, press fitting or swaging. A surface of the pin 40 may also form the inner race 36 so that the pin 40 and the bearing 32 form an integral unit. The first and second portions 42 and 44 may have generally convex surfaces 43 and 45 with flat portions 46 and 48 respectively. The flat portions 46 and 48 may be located at the top side of the pin 40 or adjacent thereto which will be explained in more detail below.

The first portion 42 has a passage 50 extending through the whole of the diameter of the first portion 42 and intersecting the flat portion 46. Similarly, the second portion 44 has a passage 52 extending through the whole of the diameter of the second portion 44 and intersecting the flat portion 48.

The track roller frame 20 is in this embodiment provided with two connection portions in the form of a first bracket 54 and a second bracket 56 which are cantilevered from the track roller frame 20. The first and second brackets 54 and 56 have recesses in the form of first and second channels 58 and 60 respectively which are in line with each other and generally parallel to the track roller frame 20. The first and second channels 58 and 60 have first and second surfaces 62 and 64 respectively which are in this embodiment generally concave or generally U-shaped thereby providing a first set of sidewalls 57 and 59 and a second set of sidewalls 61 and 63.

The first and second surfaces 62 and 64 match the generally convex surfaces 43 and 45 such that the pin 40 sits tightly in the first and second channels 58 and 60. The first and second brackets 54 and 56 have passages 66 and 68 which may be threaded and which may be blind holes or extend through the whole of the first and second brackets 54 and 56. When assembled, the pin 40 is positioned in the first and second channels 58 and 60 such that the passages 50 and 52 are aligned with the passages 66 and 68 respectively. A pair of fasteners 70 and 72 (fastener 70 is omitted from FIG. 3) are then inserted through the passages 50 and 52 and into the passages 66 and 68. In one embodiment the fasteners 70 and 72 are threaded setscrews that engage with threads located in the passages 66 and 68, which may be blind holes, but the fasteners may also extend through the first and second brackets 54 and 56 and be fixed in position by a washer and nut arrangement. If the fasteners 70 and 72 are headed fasteners, the heads are preferably positioned such that they butt up against the flat portions 46 and 48 to facilitate and maintain a durable fixation.

The pin 40 is positioned in the first and second channels 58 and 60 such that the first portion 42 is at least partially enclosed by the first set of sidewalls 57 and 59 and the surface 62. The second portion 44 is correspondingly at least partially enclosed by the second set of sidewalls 61 and 63 and the surface 64. There may be high lateral loading of the connection between the track roller frame 20 and the equalizer bar 16, but the partial enclosing and tight fitting relationship of the pin 40 and the first and second channels 58 and 60 substantially prevents lateral movement of the pin 40 in the recesses formed by the first and second channels 58 and 60 and may significantly reduce the amount of lateral load that the fasteners 70 and 72 are exposed to.

It is to be understood that the embodiment as described above can be varied in a variety of manners without departing from the scope of the claims. For example, in one embodiment the contacting surfaces of the pin 40 and first and second brackets 54 and 56 may be flat and the side load may be absorbed by a dowel arrangement, such as one where the dowels are part of the first and second bracket 54 and 56 whilst the pin 40 has matching tight fitting passages to engage the dowels. In another embodiment it may be preferred to utilize a rectangular or conical pin and channel configuration instead of a convex and concave configuration. It may also be preferred to arrange the portion on the track roller frame that engages the pin 40 such that it is a more integral part of the track roller frame rather than utilizing brackets 54 and 56.

INDUSTRIAL APPLICABILITY

The equalizer bar 16 and the track roller frame 20 may be relatively easily assembled and disassembled, due to the low number of parts and the positive positioning of the pin 40 in the channels 58 and 60. The equalizer bar 16 is provided with the bearing 32 and the pin 40 after which the equalizer bar end 15 can be rested on the roller track frame such that the pin 40 is positioned in proximity to the channels 58 and 60. Due to the bearing 32 being able to accommodate or adjust to misalignment, the pin 40 can be positioned such that the passages 52 and 68 and the passages 50 and 66 are aligned. Once aligned, the fasteners 70 and 72 which in this particular embodiment are threaded setscrews may be inserted into the passages 50 and 52 and the thread may engage with the thread in the passages 66 and 68. Due to the relatively high forces that can be achieved by tightening of the fasteners 70 and 72, the pin 40 may have a very tight fit in the passages 58 and 60, because the tightening of the fasteners 70 and 72 will force the pin 40 into the passages 58 and 60.

During operation of the work machine 10 one of the functions of the equalizer bar 16 is to function like a tie-rod, preventing both the first and second track roller frames 20 and 22 from gaining an excessive toe-in or toe-out relative to the main frame. This results in the equalizer bar pushing and pulling both the first and second track roller frames 20 and 22.

Another function of the equalizer bar 16 is to enable the first and second track roller frames to move relative to one another to provide a more comfortable and safe travel over uneven terrain. For example, during travel the second track roller frame 22 may be forced upwards, typically by encountering an object in the path of travel. By being forced upwards, the second track roller frame 22 may induce a pivotal movement of the equalizer bar 16 relative to the main frame 14 via the pivot 18. In turn, the equalizer bar 16 applies a force on the first track roller frame such that the position of the equalizer bar 16 relative to the first track roller frame 20 may change. The pin 40 is in a fixed relationship with the first and second brackets 54 and 56 and the inner race 36 of the bearing 32. Due to the forces applied by the equalizer bar 16, the inner race 36 will start to change position relative to the outer race 34. The freedom of the inner race 36 to move relative to the outer race 34 allows to a certain extent a generally unrestricted movement of the equalizer bar 16 relative to the first track roller frame 20.

The pin 40 is held in position in the first and second brackets 54 and 56 by the pin being recessed in the channels 58 and 60 in combination with the fasteners 70 and 72. Due to the pin being sunk into the recess, the first set of sidewalls 57, 59 and the second set of sidewalls 61, 63 prevent any sideways movement of the pin 40 relative to the brackets 54 and 56. The fasteners 70 and 72 prevent the pin from being lifted out of the channels 58 and 60. Without the channels taking the side load, the fasteners 70 and 72 would have to cope with the full side load which is likely to reduce the service life of the arrangement due to a high risk of the fasteners shearing.

Although the preferred embodiments of this disclosure have been described herein, improvements and modifications may be incorporated without departing from the scope of the following claims.

What is claimed is:

1. An arrangement for connecting a track roller frame to an equalizer bar of a machine, said arrangement comprising:
   a pin connected with said equalizer bar and projecting therefrom, said pin having a first surface portion with a first pin passage therethrough, said track roller frame having a first surface portion corresponding to said first surface portion of said pin, said first surface portion of said track roller frame having a first track roller frame passage extending therethrough, wherein said pin has a longitudinal axis and said pin is connected with said equalizer bar such that said longitudinal axis has three rotational degrees of freedom relative to said equalizer bar;

a first fastener extending through both said first track roller frame passage and said first pin passage in said first surface portions of said pin and said track roller frame; and a spherical bearing providing said longitudinal axis with said three rotational degrees of freedom relative to said equalizer bar.

2. An arrangement according to claim 1, wherein said first surface portion of said track roller frame is part of a recess adapted to receive said pin such that at least a portion of said pin sits in said recess.

3. An arrangement according to claim 1, wherein said first surface portion of said track roller frame is generally concave.

4. An arrangement according to claim 1, wherein said pin has a tight fit in said recess such that lateral movement of said pin in said recess is prevented.

5. An arrangement according to claim 1, wherein said spherical bearing is an elastomeric bearing.

6. An arrangement according to claim 1, wherein said pin includes a second surface portion with a second pin passage therethrough, said track roller frame including a second surface portion corresponding to said second surface portion of said pin, said second surface portion of said track roller frame having a second track roller frame passage extending therethrough, and a second fastener extending through said second pin passage and said second track roller frame passage passages in said second surface portion of said pin and said second surface portion of said track roller frame.

7. An arrangement according to claim 1 wherein said first surface portion of said track roller frame is located on a bracket, which is cantilevered from, said track roller frame.

8. A method of connecting a track roller frame to an equalizer bar of a machine, said method comprising the steps of:

providing said equalizer bar with a projecting pin having a longitudinal axis and a spherical bearing, such that the spherical bearing provides said longitudinal axis with three rotational degrees of freedom relative to said equalizer bar;

positioning at least a portion of said pin in a recess located on said track roller frame;

fastening said pin to said track roller frame by extending a fastener through said pin into a portion of said track roller frame.

9. A machine comprising:
a main frame;
an equalizer bar pivotably mounted to the main frame;
a track roller frame; and
an arrangement connecting the track roller frame to the equalizer bar, the arrangement including:

a pin connected with said equalizer bar and projecting therefrom, said pin having a first surface portion with a first pin passage therethrough, said track roller frame having a first surface portion corresponding to said first surface portion of said pin, said first surface portion of said track roller frame having a first track roller frame passage extending therethrough, wherein said pin has a longitudinal axis and said pin is connected with said equalizer bar such that said longitudinal axis has three rotational degrees of freedom relative to said equalizer bar;

a first fastener extending through both said first track roller frame passage and said first pin passage in said first surface portions of said pin and said track roller frame; and an elastomeric bearing providing said longitudinal axis with said three rotational degrees of freedom relative to said equalizer bar.

10. The machine according to claim 9, wherein said first surface portion of said track roller frame is part of a recess adapted to receive said pin such that at least a portion of said pin sits in said recess.

11. The machine according to claim 9, wherein said first surface portion of said track roller frame is generally concave.

12. The machine according to claim 9, wherein said pin has a tight fit in said recess such that lateral movement of said pin in said recess is prevented.

13. The machine according to claim 9, wherein said pin includes a second surface portion with a second pin passage therethrough, said track roller frame including a second surface portion corresponding to said second surface portion of said pin, said second surface portion of said track roller frame having a second track roller frame passage extending therethrough, and a second fastener extending through said second pin passage and said second track roller frame passage passages in said second surface portion of said pin and said second surface portion of said track roller frame.

14. The machine according to claim 9 wherein said first surface portion of said track roller frame is located on a bracket, which is cantilevered from, said track roller frame.

15. A machine having an arrangement connecting a track roller frame to an equalizer bar of a machine, the machine comprising:

a pin connected with said equalizer bar and projecting therefrom, said pin having a first surface portion with a first pin passage therethrough and a second surface portion with a second pin passage therethrough, said track roller frame having a first surface portion corresponding to said first surface portion of said pin, said first surface portion of said track roller frame having a first track roller frame passage extending therethrough, said track roller frame including a second surface portion corresponding to said second surface portion of said pin, said second surface portion of said track roller frame having a second track roller frame passage extending therethrough, wherein said pin has a longitudinal axis and said pin is connected with said equalizer bar such that said longitudinal axis has three rotational degrees of freedom relative to said equalizer bar;

a first fastener extending through both said first track roller frame passage and said first pin passage in said first surface portions of said pin and said track roller frame; and a second fastener extending through said second pin passage and said second track roller frame passage passages in said second surface portion of said pin and said second surface portion of said track roller frame.

16. The machine according to claim 15, wherein said first surface portion of said track roller frame is part of a recess adapted to receive said pin such that at least a portion of said pin sits in said recess.

17. The machine according to claim 15, wherein said pin has a longitudinal axis and said pin is connected with said equalizer bar such that said longitudinal axis has three rotational degrees of freedom relative to said equalizer bar, wherein a spherical bearing provides said longitudinal axis with said three rotational degrees of freedom relative to said equalizer bar.

18. The machine according to claim 15, wherein said pin has a longitudinal axis and said pin is connected with said equalizer bar such that said longitudinal axis has three rotational degrees of freedom relative to said equalizer bar, wherein an elastomeric bearing provides said longitudinal axis with said three rotational degrees of freedom relative to said equalizer bar.

* * * * *